United States Patent [19]

Yuen

[11] Patent Number: 5,339,437
[45] Date of Patent: Aug. 16, 1994

[54] METHOD AND APPARATUS FOR SAVING A SYSTEM IMAGE ONTO PERMANENT STORAGE THAT IS OPERATING SYSTEM INDEPENDENTLY

[75] Inventor: Desmond Yuen, San Leandro, Calif.

[73] Assignee: Intel Corporation, Santa Clara, Calif.

[21] Appl. No.: 140,277

[22] Filed: Oct. 20, 1993

Related U.S. Application Data

[63] Continuation of Ser. No. 858,323, Mar. 25, 1992, abandoned.

[51] Int. Cl.[5] .................. G06F 12/06; G01R 31/28
[52] U.S. Cl. .................. 395/700; 364/230.2; 364/DIG. 1; 364/280.8
[58] Field of Search .............. 395/700; 364/DIG. 1, 364/230.2, 280.8

[56] References Cited

U.S. PATENT DOCUMENTS 5,175,853 12/1992 Kardach et al. .............. 395/650

Primary Examiner—Kevin A. Kriess
Assistant Examiner—A. Katbab
Attorney, Agent, or Firm—Blakely Sokoloff Taylor & Zafman

[57] ABSTRACT

At least one storage parameter table is initialized to reserve an area of permanent storage for saving a system image. The reserved area is not formatted by the operating system for general use storage. Additionally, a system management mode (SMM), a dedicated system management memory (SMRAM), a system management interrupt (SMI), an SMI service routine, a Resume instruction (RSM), various mechanism for triggering an SMI, and various mechanisms for triggering an RSM event are provided. Together, these elements allow system management functions to be performed in a manner that is transparent to the operating system and applications. Furthermore, a suspend mode, various suspend levels including a zero volt suspend, a suspend handler, various suspend request delay timers, various mechanisms for triggering a suspend request and various mechanisms for triggering a resume event while in suspend mode are also provided. The suspend handler is provided as part of the SMI service routine. In particular, the suspend handler saves a system image onto the reserved area before shutting off the power from all of the components, excluding the real time clock and the logic, for resuming execution when processing a zero volt suspend request. As a result, a system image may be saved onto permanent storage in a manner that is operating system independent.

14 Claims, 5 Drawing Sheets

METHOD AND APPARATUS FOR SAVING A SYSTEM IMAGE ONTO PERMANENT STORAGE THAT IS OPERATING SYSTEM INDEPENDENTLY

This is a continuation of application Ser. No. 07/858,323, filed Mar. 25, 1992, now abandoned.

BACKGROUND OF THE INVENTION

1. Field of the Invention

The present invention relates to the field of computer systems, in particular, battery powered and/or microprocessor based computer systems. More specifically, the present invention is related to the methods employed by these computer systems for saving a system image onto a permanent storage device.

2. Background

Various approaches with varying degrees of sophistication and effectiveness in reducing power consumption for computer systems, particularly battery powered computer systems, have been developed. In fact, often times, multiple approaches are employed to achieve maximum reduction in power consumption.

One traditional approach employed by many computer systems, particularly battery powered computer systems to reduce power consumption, is to slow down the CPU clock, or stop the CPU clock, if the system remains idle for a prolonged period of inactivity. The CPU clock is restored to its normal speed when an active system event is detected. The approach is simple to implement, and the state of the system just prior to slowing down or stopping the CPU does not have to be saved. However, the potential for reduction of power consumption is not as great of an approach that power to most components of the computer system can be shut off.

Another traditional approach employed by many computer systems, particularly battery powered computer systems, as an alternative or additional approach to reduce power consumption, is to selectively save the state of individual peripheral devices, and shut off power to the peripheral devices whose states have been saved, if they have not been used for a while. Power is resupplied to a peripheral device, and the peripheral device is restored to the state just before the power is shut off, when it is eventually accessed. While the approach is more difficult to implement, the potential for reduction in power consumption is greater than the previous approach. However, the potential for reduction in power consumption can still be greater if power to more components of the computer system can be shut off.

Yet another tradition approach employed by many computer systems, particularly battery powered computer systems, as a further alternative or additional approach to reduce power consumption, is to save the state of the system in memory, shut off power to all non-essential components of the computer system, except the CPU, I/O interface modules and system memory, and suspend the computer system under various conditions, including prolonged idleness. Power is restored to the non-essential components, and the system is restored to the state just prior to the power shut off when a resume execution condition is detected. Again, while the approach is more difficult to implement, the potential for reduction of power consumption is greater than the previous approaches. Nevertheless, the potential for reduction in power consumption can still be greater if power to the CPU, the I/O interface modules, and the system memory, can also be shut off.

Yet another traditional approach employed by many computer systems, particularly battery powered computer systems, as a further alternative or additional approach to reduce power consumption, is to save an image of the system onto permanent storage, and shutting off power to all components of the computer system, including the CPU, I/O interface modules, and system memory, excluding the real time clock and the logic for resuming execution under various conditions, including prolonged idleness. Power is restored to all power off components, and the system is restored to the state just prior to the power shut off when a resume execution event is detected. While the approach is more difficult to implement, the potential for reduction in power consumption is greater than any of the previous approaches.

Traditionally, since the file subsystems of different operating systems typically employ different formats in formatting permanent storage, under the approach of shutting power off to all components except the real time clock and the logic for resuming execution, either the operating system will have to save the system image before the power management hardware is invoked or the power management hardware will have to be made cognizant of which operating system is executing when saving the system image onto permanent storage. Therefore, it is desirable if the system image may be saved onto permanent storage in an operating system independent manner.

Additionally, in many battery powered computer systems that employ the last approach, typically an image of the system is also saved onto permanent storage device in the event of a low battery condition. For the smaller battery powered and microprocessor based computer systems, such as desktop, notebook and palm computers, typically there is no dedicated device or area of permanent storage for saving system image. The multi-purpose permanent storage is also used for storing user applications and/or data. Thus, for the battery powered and microprocessor based computer systems, if the saving of the system image is due to low battery and the operation is performed in an operating system dependent manner, the operation may result in data loss. Data stored on the multi-purpose permanent storage may be corrupted as a result of the process of saving the system image not being able to complete before power runs out. Therefore, it is particularly desirable for the battery powered and microprocessor based computer systems if the system image may be saved onto permanent storage in an operating system independent manner.

As will be described, this object and desired result is among the objects and desired results achieved by the present invention. The present invention provides an improved method and apparatus for saving a system image onto permanent storage that is operating system independent. The improved method and apparatus will not corrupt user data on multi-purpose permanent storage of a battery powered and microprocessor based computer systems even if the process of saving the system image is unable to complete before power runs out.

SUMMARY OF THE INVENTION

A method and apparatus for saving system image that is operating system independent is disclosed. The method and apparatus has particular applications to computer systems, particularly battery powered and/or microprocessor based computer systems.

Under the presently preferred embodiment of the present invention, a mass storage device, a BIOS parameter table and a BIOS parameter table interrupt is provided to a computer system comprising a central processing unit, (CPU). An area on the mass storage device of appropriate size is reserved for storing an image of the computer system. The BIOS parameter table is initialized to describe the net storage capacity and the reserved area. The BIOS parameter table interrupt points to the starting location of the BIOS parameter table.

Additionally, under the presently preferred embodiment, a system management mode (SMM), a dedicated system management memory (SMRAM), a system management interrupt (SMI), an SMI service routine, a resume instruction (RSM) and various mechanisms for triggering SMIs and RSM events are provided to the computer system. Under the SMM, various system management functions may be performed by the SMI service routine in a manner transparent to the operating system and the application programs executing on the computer system. The computer system enters the SMM when an SMI is detected. The SMI service routine is stored in the SMRAM and is given control after the SMI microcode, upon detection of an SMI, maps the SMRAM into a predetermined area of the computer system's memory address space, and saves the CPU state into the SMRAM. The SMI is a non-maskable interrupt, and can be triggered in a number of ways.

The RSM instruction restores the CPU to the state at the time of which the SMI was detected, switches the SMRAM out of the computer system's memory address space, takes the computer system out of the SMM and returns it to its normal operating mode. The RSM instruction is executed by the SMI service routine when an RSM event is detected. RSM events may be triggered in a variety of manners.

Furthermore, under the presently preferred embodiment, a suspend mode, various levels of suspend, a suspend handler, various suspend delay timers, and various ways of requesting the different levels of suspend are provided to the computer system. Under suspend mode, the suspend handler shuts off power for various devices selectively depending on the level of suspend. In zero-volt suspend, the suspend handler shuts the power off to all devices excluding power to the real time clock and the RSM state machine. Additionally, for zero-volt suspend, the suspend handler saves the system image onto the reserved area of the permanent storage device before performing the power shut off. The suspend handler is provided as a part of the SMI service routine stored in the SMRAM, and is given control after the SMI service routine gets control as a result of an SMI triggered by a suspend request. An SMI is triggered by a suspend request after the appropriate delays. The suspend request may be made in a variety of manners.

The RSM instruction is also used to take the computer system out of the suspend mode and returns the CPU to the state just before the SMI was detected. However, when a resume event is detected during a zero volt suspend, the CPU is first reset, and the computer system is reconfigured and reinitialized. During reinitialization another SMI is triggered to put the computer system in the SMM. Upon reentering the SMM, the saved state of the computer system is restored by the SMI service routine into the SMRAM using the system image saved in the reserved area of the mass storage device. The RSM instruction is executed by the SMI service routine after the saved state has been restored into the SMRAM. The resume event may be triggered in a variety of manners during a zero volt suspend.

BRIEF DESCRIPTION OF THE DRAWINGS

The objects, features and advantages of the present invention will be apparent from the following detailed descriptions of the preferred embodiment of the invention with references to the drawings in which.

DETAILED DESCRIPTION PRESENTLY PREFERRED AND ALTERNATE EMBODIMENTS

A method and apparatus for saving a system image onto a permanent storage device that is operating system independent is disclosed. The method and apparatus has particular applications to computer systems, particularly battery powered, microprocessor based computer systems.

In the following description for the purpose of clarification, specific numbers, materials and configurations are set forth in order to provide a thorough understanding of the present invention. However, it will be apparent to one skilled in the art, that the present invention may be practiced without the specific details. In other instances, well known systems are shown in a diagrammatical or block diagram form in order not to obscure the present invention unnecessarily.

System Overview

Figure 1:
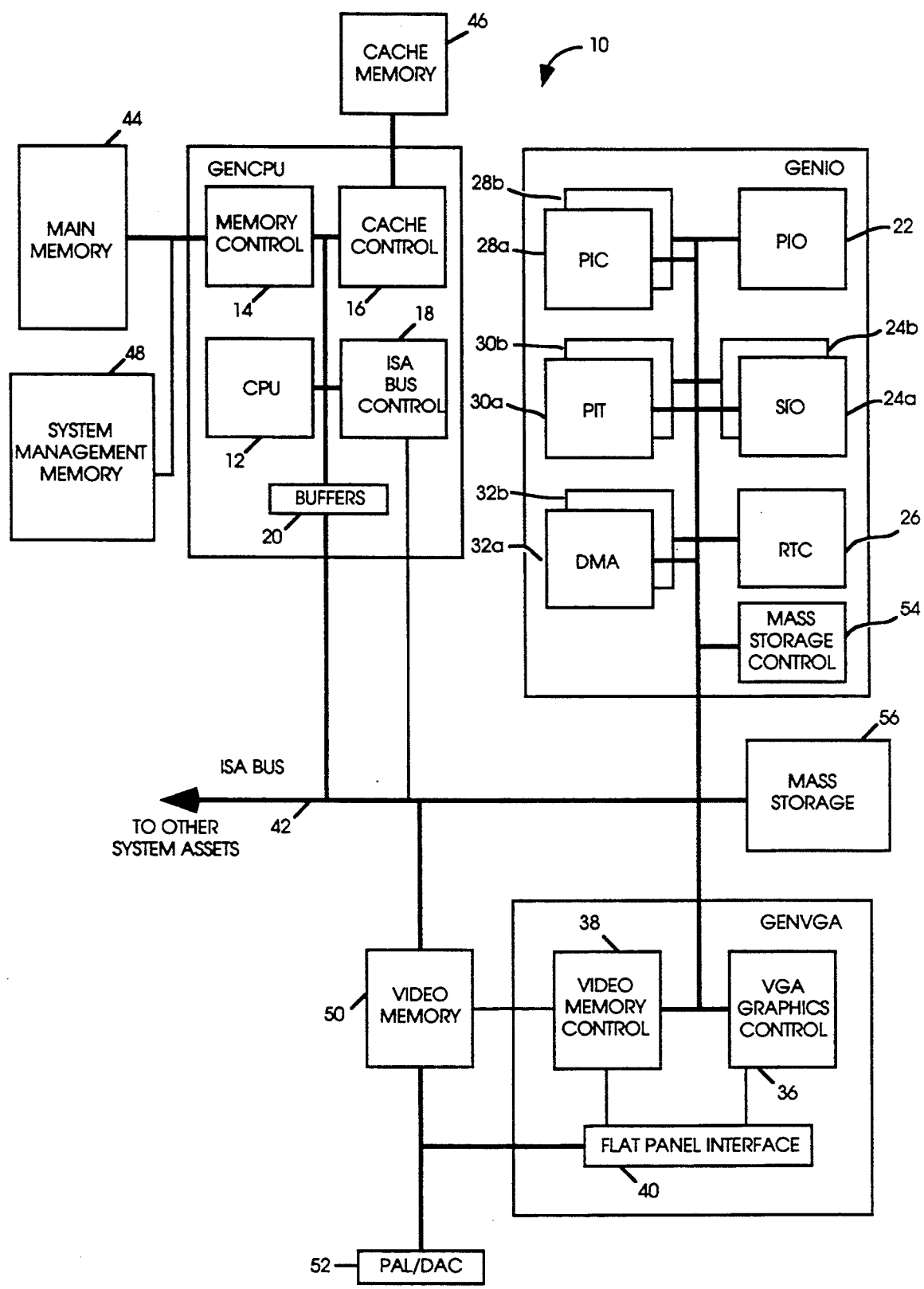
FIG. 1 is a functional block diagram of an exemplary battery powered, microprocessor based computer system embodying the present invention.

Referring now to FIG. 1, a block diagram illustrating an exemplary battery powered, microprocessor based computer system embodying the present invention is shown. The exemplary battery powered, microprocessor based computer system 10 is briefly described below. The exemplary battery powered, microprocessor based computer system 10 is essentially the "Intel386 TM SL Microprocessor Superset", manufactured by Intel Corporation, the corporate assignee of this invention. However, it is to be understood that the present invention is not limited to this particular microprocessor design, and may be incorporated in virtually any computer system design regardless whether it is microprocessor based and/or battery powered.

Throughout this description, certain terminology relating to the "Intel386 TM SL Microprocessor Superset", such as register names and signal nomenclature, is employed to describe the present invention. Such terminology is understood by practitioners in the field of computer system design and will therefore, not be explained at length herein.

The exemplary battery powered, microprocessor based computer system 10 comprises three main components, designated as GENCPU, GENIO and GENVGA. GENCPU is an expanded central processing unit. GENIO is a single chip input/output unit. Finally, GENVGA is a single chip graphics interface. These three components communicate with each other and with other system components (such as expansion slots, keyboard controllers and disk controllers) via ISA bus 42.

GENCPU includes a CPU 12, a memory controller 14, a cache controller 16, ISA bus control logic 18 and line buffers 20. CPU 12 comprises a plurality of general registers (not shown), an instruction pointer register (not shown) containing an instruction pointer, and a prior instruction pointer register (not shown) containing a prior instruction pointer. The instruction pointer controls instruction fetching. CPU 12 automatically increments the instruction and prior instruction pointers to point to the next instruction to be executed and the instruction just executed respectively after executing an instruction.

The CPU 12 also comprises logics (not shown) for executing a plurality of instructions. The instructions operate on either zero, one, or two operands. An operand either resides in the instruction, in a register, or in a memory location. The CPU 12 has two modes of operations; a real mode and a protected mode. The primary difference between the real mode and the protected mode is that a logical address is translated into a linear address, the size of the address space, and paging capability.

Additionally, the CPU 12 comprises logics (not shown) for executing a plurality of hardware interrupts. Hardware interrupts occur as the result of an external event and are classified into two types; maskable and non-maskable. Interrupts are serviced after the execution of the current instruction. After the interrupt service routine is finished with servicing the interrupt, the execution proceeds with the instruction immediately after the interrupted instruction. Maskable interrupts are typically used to respond to asynchronous external hardware events. Unmaskable interrupts are typically used to service very high priority events.

Furthermore, the CPU 12 comprises logics (not shown) for configuring the computer system during the initial system start up and reset. After configuring the computer system, the CPU 12 loads the operating system (not shown) and transfers control to the operating system. The operating system comprises initialization routines for initializing the computer system during initial system start up and the CPU reset.

GENIO includes parallel ports (PIO) 22, dual serial ports (SIO) 24a, 24b, real time clock unit (RTC) 26, dual programmable interrupt controllers (PIC) 28a, 28b, dual programmable timers (PIT) 30a, 30b, dual direct memory access controllers (DMA) 32a, 32b and mass storage controller 54. GENVGA includes VGA graphics controller 36, video memory controller 38 and interface 40 for a flat panel display unit.

Additionally, external to the three main components are system memory 44, cache memory 46, system management memory 48, video memory 50, mass storage 56, and an interface (PAL/DAC) 52 for a conventional VGA monitor. The system memory 44 and the system management memory 48 are accessed by the memory controller 14. The cache memory 46 and the video memory 50 are accessed by the cache memory controller 16 and video memory controller 38 respectively. The video memory 50 may also be accessed through the ISA bus 42, and the two interfaces 40, 52. The mass storage 56 is accessed by the DMA controllers 32a and 32b and the mass storage controller 54 through the ISA bus 42.

For further description of the "Intel386 TM SL" Microprocessor Superset, see Intel386 TM SL Microprocessor Superset Programmer's Reference Manual, published by Intel Corporation as publication number 240815, and related publications.

System Image Save Reserved Area

Figure 2A:
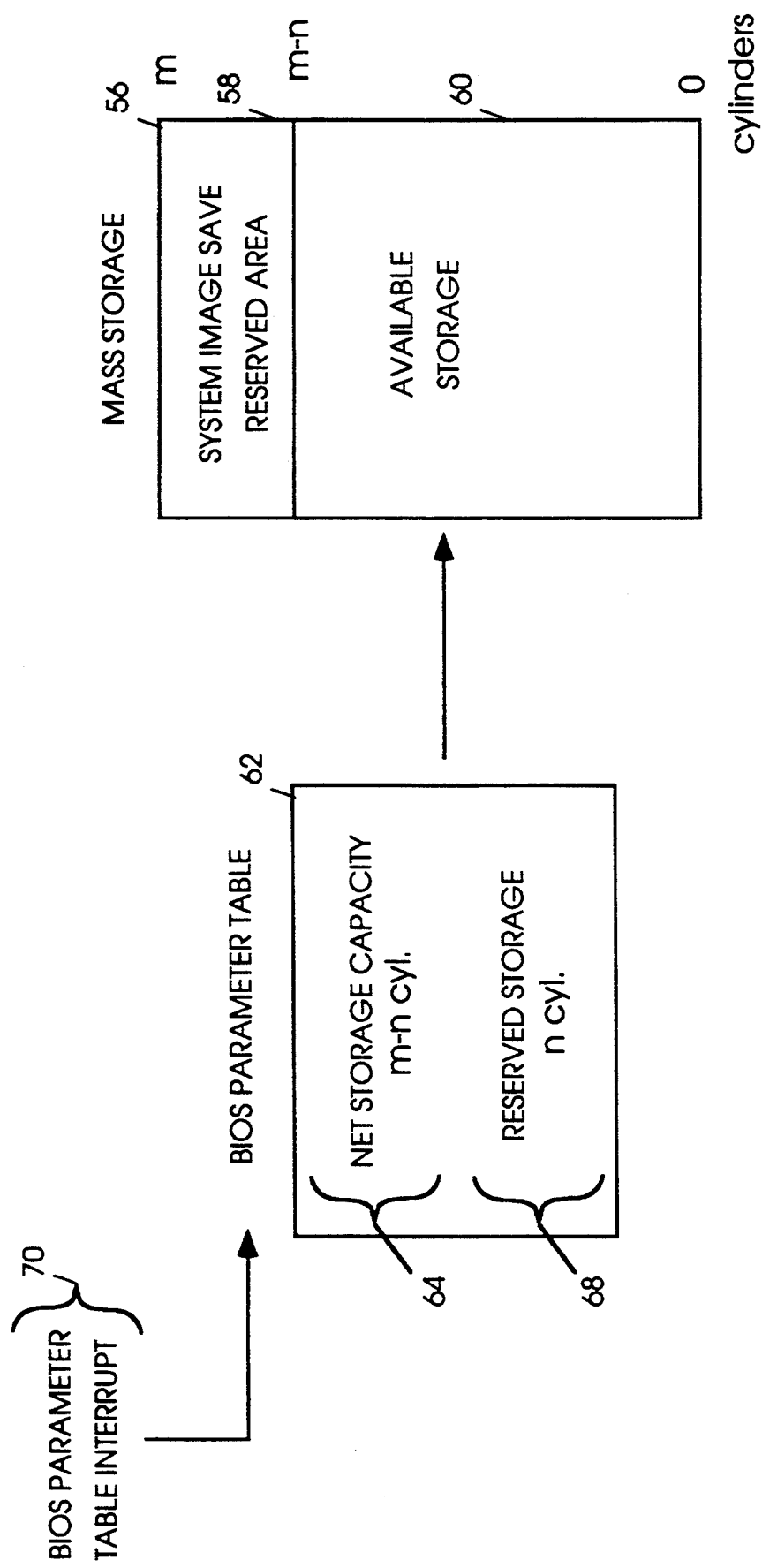
FIGS. 2a–2b are block diagrams illustrating the presently preferred, and an alternate embodiment of the system image save reserved area architecture of the present invention.
Figure 2B:
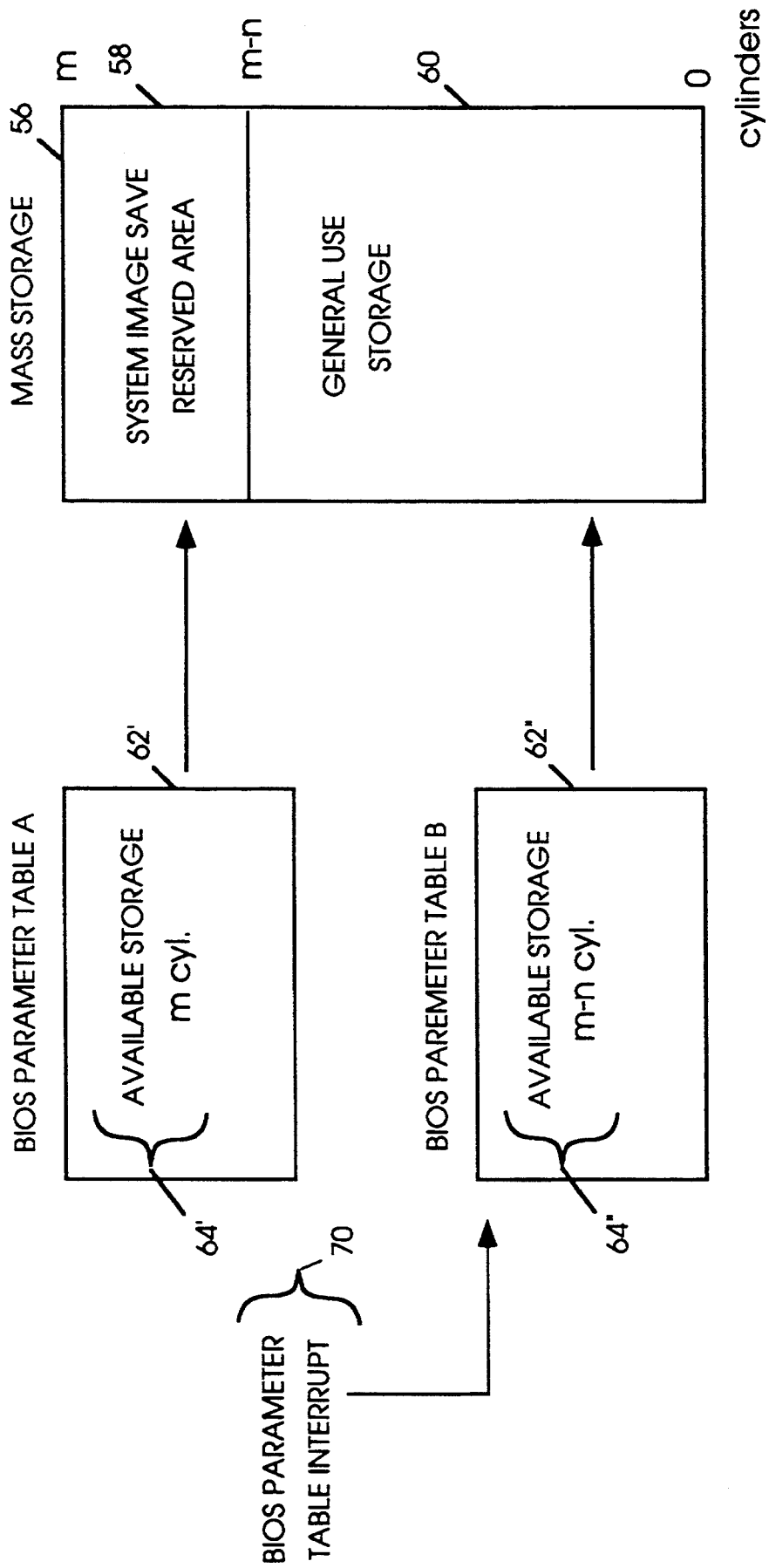

Referring now to FIGS. 2a–2b, two block diagrams illustrating the presently preferred embodiment and an alternate embodiment of the system image save reserved area architecture of the present invention is shown. The presently preferred embodiment illustrated in FIG. 2a is a more efficient practive of the present invention but require modifications. to existing BIOS supports. The alternate embodiment illustrated in FIG. 2b allows the present invention to be practiced without modifications to existing BIOS supports.

Shown in FIG. 2a is a mass storage device 56, having a storage capacity of m cylinders. N of the m cylinders 58 are reserved for saving a system image, leaving m−n cylinders 60 available for general use. The mass storage device 56 is intended to represent a broad category of non-volatile permanent storage devices, such as an IDE hard disk.

Also shown is a BIOS parameter table 62, comprising a net storage capacity parameter 64, describing the net storage capacity of the mass storage device 56, and a reserved storage parameter 68, describing the reserved area capacity of the mass storage device 56. The division between the reserved and general use area is achieved by initializing the net storage capacity parameter 64 to m−n cylinders, and the reserved storage parameter 68 to n cylinders.

The operating system initializes the first m−n cylinders 60 of the mass storage device 56 for general use in accordance with the net storage capacity parameter 64. This leaves the next n cylinders as a reserved area for system image saving. The operating system independent system image saving software saves a system image into the next n cylinders after the first m−n cylinders in accordance to the two parameters 64 and 68. Both the operating system and the system image saving software locates the BIOS parameter table 62 using the BIOS parameter table interrupt 70.

Formatting and accessing a mass storage device by an operating system are well known and will not be described further. The operating system independent system image saving software will be described in further detail below with references to FIGS. 3 and 4.

Similarly, shown in FIG. 2b is the mass storage device 56 having storage capacity of m cylinders. N of the m cylinders 58 are reserved for saving a system image, leaving m−n cylinders 60 available for general use. However, also shown are two BIOS parameter tables 62' and 62", each comprising an available storage capacity parameter 64' and 64" describing the storage capacity of the mass storage device 56. The BIOS parameter interrupt 70 is set up to point to the starting location of the second BIOS parameter table 62". The division between the reserved and general use area is achieved by initializing the available storage parameter 64' of the first BIOS parameter table to m cylinders, and the available storage parameter 64" of the second BIOS parameter table to m–n cylinders.

The operating system initializes the first m–n cylinders 60 of the mass storage device 56 for general use in accordance to the available storage parameter 64', leaving the next n cylinders as reserved area for system image saving. The operating system independent system image saving software saves a system image into the next n cylinders after the first m–n cylinders in accordance to the two parameters 64' and 64". Both the operating system and the system image saving software locates the second BIOS parameter table 62" using the BIOS parameter table interrupt 70. The system image saving software locates the first BIOS parameter table 62' at a predetermined location.

System Management

Figure 3:
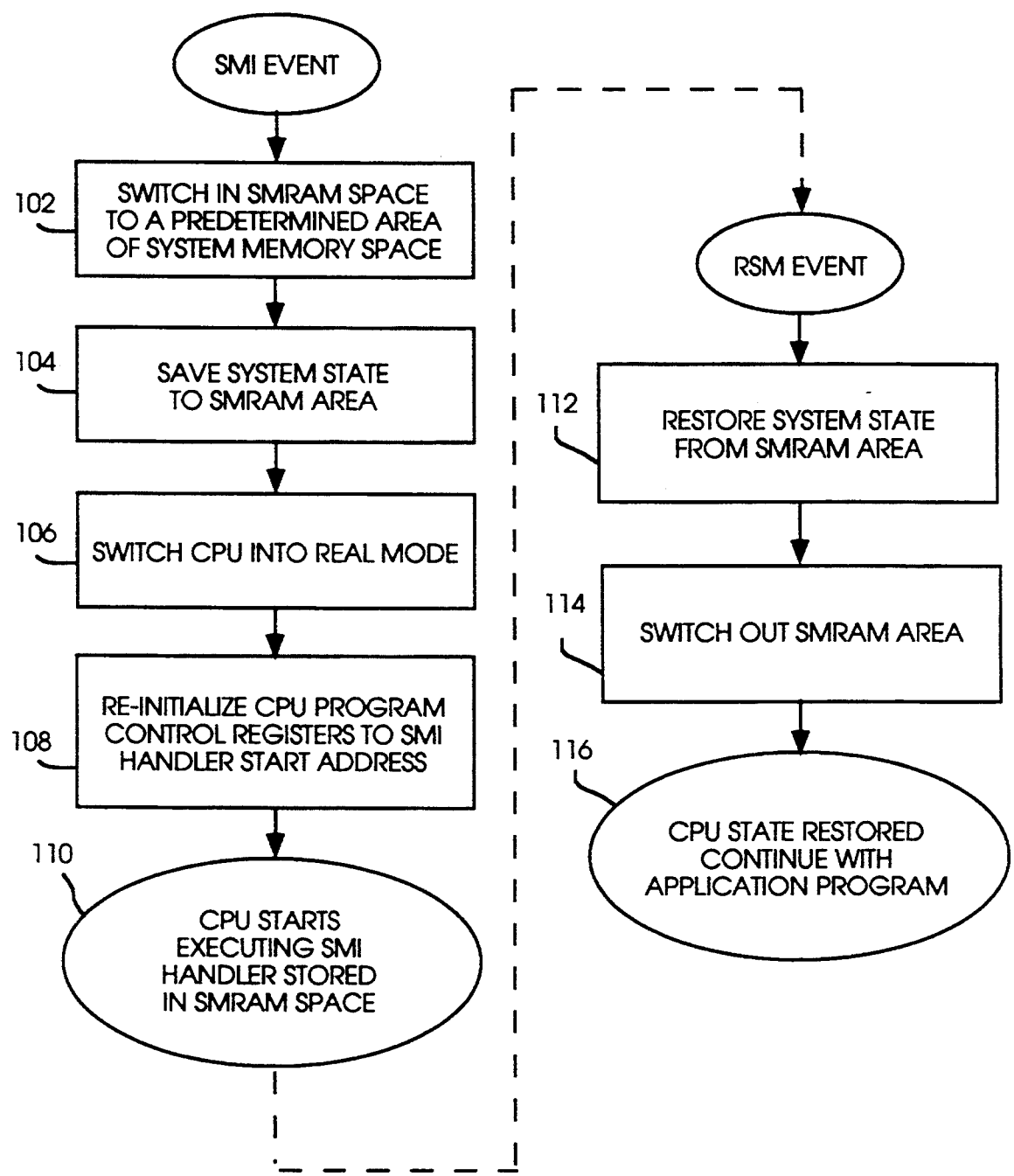
FIG. 3 is a flow diagram for system management on the exemplary battery powered, microprocessor based computer system of FIG. 1.

Referring now to FIG. 3, a block diagram illustrating the operation flow of system management on the exemplary battery powered and microprocessor based computer system illustrated in FIG. 1. System management on the exemplary battery powered and microprocessor based computer system is implemented as follows:

1. A system management mode (SMM) is provided to the CPU. Under the SMM, various system management functions are performed. These system management functions are performed in a manner that is transparent to the operating system and the application programs.

2. A system management interrupt (SMI) is provided to put the CPU in the SMM. The SMI is a non-maskable interrupt having the highest priority than all other interrupts, including other non-maskable interrupt.

3. An SMI handler is provided to the computer system to service the SMI. The SMI handler determines the SMI triggering event and performs system management functions accordingly.

4. A system management memory (SMRAM) is provided to the computer system for storing the SMI handler, and the state of the computer system at the time the SMI is detected. The SMRAM is mapped into the computer system's memory address space only under the SMM.

5. A resume instruction (RSM) for returning the CPU to the state just before the SMI was detected and resuming execution at the next instruction.

6. Various mechanisms for triggering an SMI event and various mechanisms for triggering an RSM event are provided to the computer system. Particular examples of mechanism for triggering an SMI event are external SMI pins and local and global timers. Particular examples of mechanisms for triggering an RSM event are system event and I/O traps.

Upon detection of an SMI event, the CPU maps the SMRAM to a pre-determined area of main memory space, block 102. As described earlier, the SMRAM is normally not mapped as part of the main memory space, thereby making it inaccessible to the operating system as well as the applications. Additionally, the CPU saves the system state into the SMRAM space, block 104, switches the CPU into real mode, block 106, re-initializes the CPU's program control registers, block 108, and starts execution of the SMI handler, block 110.

Recovery out of the SMM is accomplished upon recognition of an RSM event which causes the SMI handler to execute the "Resume" instruction. The RSM microcode restores the system state stored in the SMRAM area, block 112. Upon restoring the system state, the CPU switches out the SMRAM area and unmaps it as part of the main memory space, block 114, and continues execution of the interrupted operating system or application program, block 116.

For further description of system management and its various extensions and applications on the "Intel386 TM SL" Microprocessor Superset, see Intel386 TM SL Microprocessor Superset Programmer's Reference Manual, published by Intel Corporation as publication number 240815, and related publications. Additionally, please see copending U.S. patent applications, Ser. No. 07/753,605, entitled Transparent System Interrupts with Integrated Extended Memory Addressing, Ser. No. 07/753,327, entitled Transparent System Interrupts with Automated Halt Restart, Ser. No. 07/753,107, entitled Transparent System Interrupts with Automated Input/Output Trap Restart, Ser. No. 07/886,965, entitled Method & Apparatus For Servicing Transparent System Interrupts and Reducing Interrupt Latency, Ser. No. 07/858,301, entitled Method and Apparatus For Debugging A Computer System, and Ser. No. 07/594,278, Transparent System Interrupt.

Suspend Management

Figure 4:
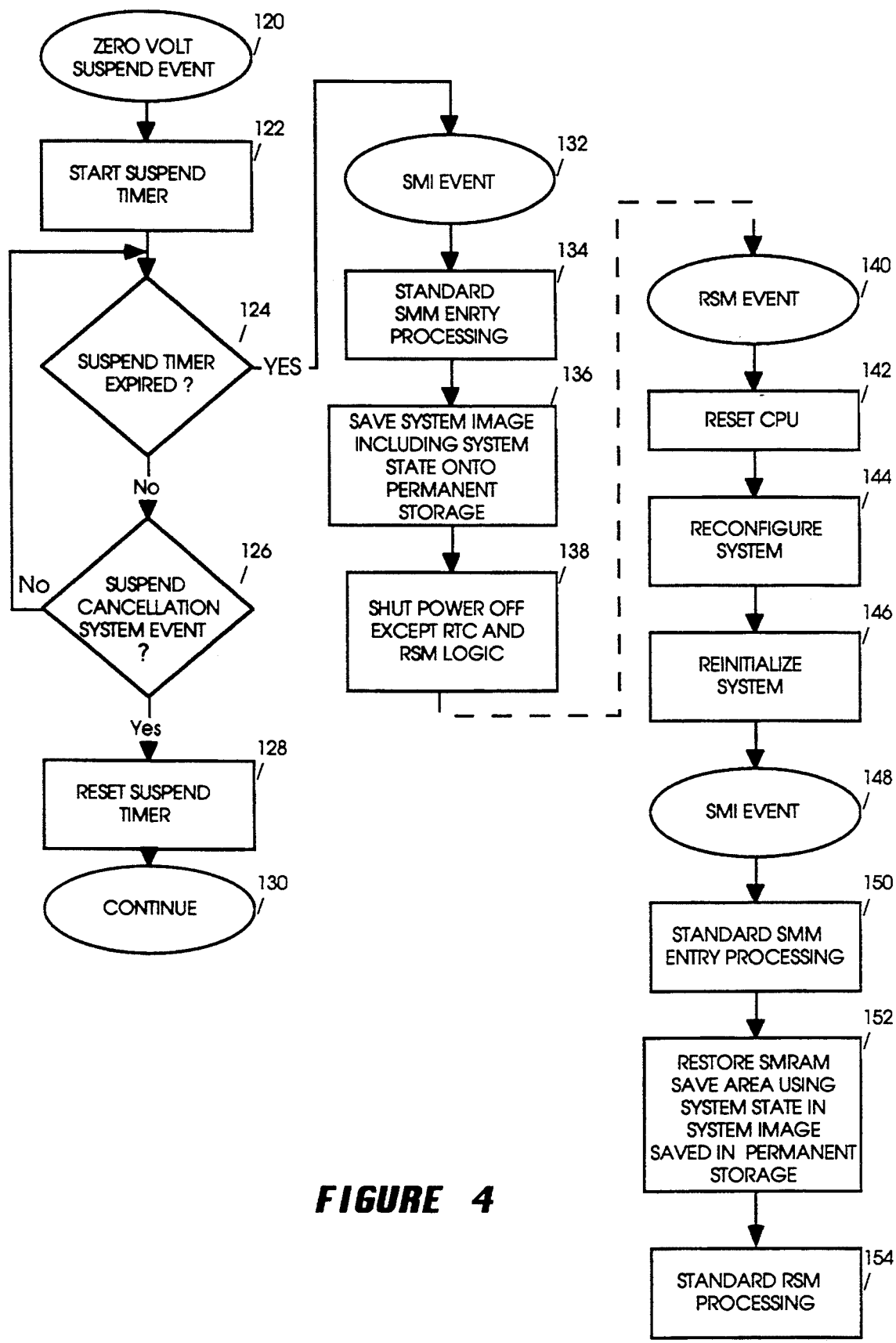
FIG. 4 is a flow diagram for suspend management on the exemplary battery powered, microprocessor based computer system of FIG. 1.

Referring now to FIG. 4, a block diagram illustrating the operation flow of suspend management on the exemplary battery powered, microprocessor based computer system illustrated in FIG. 1. System management on the exemplary battery powered, microprocessor based computer system is implemented as follows:

1. A suspend mode is provided to the computer system.

2. Various levels of suspend, including a zero volt suspend, is provided under the suspend mode. Under zero-volt suspend, power to all components, excluding the real time clock and the logic for resuming execution, is shut off.

3. Various suspend request delay timers are provided to allow sufficient time for completing in progress precessions before putting the computer system into one of the suspend levels. The suspend request delay timers are started upon detection of a suspend request. The suspend delay timers trigger an SMI upon its expiration. The suspend request is cancelled if a suspend request cancellation is detected during the count down.

4. A suspend handler is provided as part of the SMI handler. The suspend handler processes the suspend requests. In particular, for a zero volt suspend request, the suspend handler saves the system image onto the reserved area of the mass storage device and shuts power off to all components of the computer system, excluding the real time clock and the logic for resuming execution.

5. Various mechanisms for triggering a suspend request, and various mechanisms for triggering an RSM event while in suspend mode are provided to the computer system. Particular examples of mechanisms for triggering a suspend request are the suspend button, auto power off timer, and the low battery detector. Particular examples of mechanisms for triggering an RSM event while in suspend mode are resume button and modem ring detector.

Upon detection of a zero volt suspend request, the CPU starts the suspend timer, block 122. If a suspend cancellation system event is detected, block 126, before the suspend timer expires, the CPU cancels the suspend request, block 128, and continues its processing, block 130.

Upon expiration of the suspend timer, the expired suspend timer triggers an SMI requesting zero volt suspend, block 132. Upon detection of the SMI, the CPU performs standard SMM entry processings, block 134, as described above. The suspend handler which is implemented as part of the SMI handler is given control once the SMI handler gets control after standard SMM entry processings have been completed. The suspend handler saves the system image onto the system image save reserved area of the mass storage device, block 136. As described earlier, the suspend handler locates the reserved area using the BIOS parameter table(s). At least one of the BIOS parameter table is located using the BIOS parameter table interrupt. If two BIOS parameter tables are used, the other one is located at a predetermined location. After saving the system image, the suspend handler then shuts the power off to all components of the computer system, excluding the real time clock and the logic for resuming execution, block 138.

Recovery out of the suspend mode is accomplished upon recognition of an RSM event which causes the SMI handler to execute the "Resume" instruction. Upon detection of an RSM event while the computer system is in zero volt suspend, the RSM logic resets the CPU block 142, and causes the CPU to recognize the computer system block 144. After reconfiguration, the operating system reinitializes the computer system, block 146. Upon detection of the system being reinitialized to recover from a zero volt suspend, the reinitialization process triggers another SMI, block 148.

Again, upon detection of the SMI, the CPU performs standard SMM entry processings described above, 150. Upon getting control and determining that the SMI is triggered by the initializing process, the SMI handler restores saved system state in the SMRAM save area using the saved system image in the reserved area of the mass storage device, block 152. After restoring the saved system state, the SMI handler executes the RSM instruction. The RSM microcode performs the standard RSM processings and returns the CPU to the state just before the SMI triggered by the zero volt suspend request.

While the suspend management is described with the zero volt suspend, it will be appreciated that the various levels of suspend may comprise other levels of suspend having power shut off from different components of the computer system. Similarly, while the present invention of saving of the system image onto a permanent storage device in an operating system independent manner is described in the context of zero volt suspend, it will also be appreciated that the present invention may be practiced with other SMI triggering events.

Other Variations

While the method of the present invention has been described in terms of its presently preferred and alternate embodiments, those skilled in the art will recognize that the method of the present invention is not limited to the embodiments described. The method of the present invention may be practiced with modification and alteration within the spirit and scope of the appended claims. The specifications and drawings are, accordingly, to be regarded in an illustrative rather than a restrictive sense.

What is claimed is:

1. In a computer system comprising a central processing unit (CPU) coupled to at least one memory unit and at least one permanent storage unit for executing at least an operating system comprising a plurality of said CPU's instructions, said CPU further having at least two modes of program execution, a real mode and a protected mode, and at least one interrupt for interrupting program execution, a method for saving a system image of said computer system onto said at least one permanent storage unit in a manner that is independent of said operating system, said method comprising the steps of:
   (a) interrupting execution of said operating system and other programs, if any, upon receipt of a predetermined input, said interruption being unmaskable by said operating system and other programs, if any, and having a higher priority than other interruptions;
   (b) switching in and mapping a dedicated memory area of said at least one memory unit to a pre-determined segment of main memory space of said computer system, said dedicated memory area comprising a pre-stored interrupt processing program having executable instructions for saving a system image onto a reserved system image save area of said at least one permanent storage unit,
   said dedicated memory area being normally not mapped as part of said main memory space thereby keeping said dedicated memory area inaccessible to said operating system and other programs, if any, executed by said CPU,
   said system image save area being pre-reserved on said at least one permanent storage unit and made known to said interrupt processing program in a predetermined manner, said reserved system image save area not being formatted and used for general storage by said operating system;
   (c) storing current system state data of said computer system into said dedicated memory area for subsequent resumption of execution of said operating system and other programs, if any;
   (d) switching said CPU into said real mode of execution; and
   (e) starting execution of said interrupt processing program in said real mode and saving a system image of said computer system onto said reserved system image save area, said saved system image of said computer system comprising said stored system state data of said computer system.

2. The method as set forth in claim 1, wherein, said pre-reserving of said system image save area comprises the step of pre-initializing at least one storage capacity parameter of at least one permanent storage parameter table of said computer system such that said operating system excludes said system image save area from general storage usage;
   said operating system using said at least one permanent storage parameter table to determine general storage capacity and locations, and said interrupt processing program using said at least one permanent storage parameter table to locate said reserved system image save area.

3. The method as set forth in claim 1, wherein,
   said pre-stored interrupt processing program further comprises executable instructions for shutting power off from all components of said computer system except a real time clock and execution resumption circuits of said computer system, in response to a zero volt suspend request;

said pre-determined input in said step a) is a zero-volt suspend request; and said interrupt processing program in said step e) further shuts power off from said all components of said computer system except said real time clock and said execution resumption circuits after saving said system image of said computer system onto said reserved system image save area.

4. The method as set forth in claim 3, wherein, said executable instructions for shutting power off and said executable instructions for saving a system image are part of a suspend request processing subprogram, said suspend request processing subprogram being part of said interrupt processing program.

5. The method as set forth in claim 3, where, said step a) is performed after waiting a predetermined period of time after receiving said zero-volt suspend request, and failing to detect a suspend request cancellation event during said waiting period.

6. The method as set forth in claim 1, wherein, said method further comprises the steps of:

(f) restoring said stored system state data of said computer system from said dedicated memory area to said CPU, said restoration being controlled by said interrupt processing program;

(g) switching out an unmapping said dedicated memory area from said main memory space; and (h) resuming execution of said operating system and other programs, if any.

7. The method as set forth in claim 6, wherein, said pre-stored interrupt processing program further comprises executable instructions for shutting power off from all components of said computer system except a real time clock and execution resumption circuits of said computer system, in response to a zero volt suspend request, and executable instructions for restoring said saved system state data from said reserved system image save area into said dedicated memory area;

said pre-determined input in said step a) is a zero-volt suspend request;

said interrupt processing program in said step e) further shuts power off from said all components of said computer system except said real time clock and said execution resumption circuits after saving said system image of said computer system onto said reserved system image save area; and said step f) comprises the steps of, f.1) resetting said CPU;

f.2) reconfiguring said computer system;

f.3) reinitializing said computer system;

f.4) interrupting said reinitialization;

f.5) switching in and mapping said dedicated memory area to said predetermined area of said main memory space;

f.6) storing current system state data of said computer system into said dedicated memory area for subsequent resumption of execution;

f.7) switching said CPU into said real mode of execution; and f.8) starting execution of said interrupt processing program in said real mode having said suspend request processing program restoring said saved state data of said computer system into said dedicated memory area using said saved system image of said computer system in said reserved system image save area.

8. An improved computer system comprising a central processing unit (CPU) coupled to at least one memory unit and at least one permanent storage unit for executing at least one operating system, comprising a plurality of said CPU's instructions, said CPU further having at least two modes of program execution, a real mode and a protected mode, and at least one interrupt for interrupting program execution, wherein the improvement to said computer system comprises:

(a) said at least one permanent storage unit having a reserved area for saving a system image of said computer system, said reserved system image save area not being formatted and used for general storage by said operating system;

(b) said at least one memory unit having a dedicated memory area for storing an interrupt processing program, and current system state data of said computer system, said dedicated memory area being not mapped as part of main memory space thereby keeping said dedicated memory area inaccessible to said operating system and other programs, if any, executed by said CPU;

(c) said interrupt processing program for servicing a System Management Interrupt (SMI), said interrupt processing program comprising executable instructions for saving a system image onto said reserved system image save area, said saved system image of said computer system comprising said stored system data of said computer system;

(d) said interrupts having said SMI for interrupting execution of said operating system and other programs, if any, switching in and mapping said dedicated memory area to a pre-determined segment of said main memory space, storing said current system state data of said computer system into said dedicated memory area for subsequent resumption of execution of said operating system and other programs, if any, switching said CPU into said real mode of execution, and starting execution of said interrupt processing program in said real mode, said SMI being unmaskable by said operating system and said other programs, if any, and having a higher priority than other interrupts; and (e) interrupt detection means for detecting a predetermined input and triggering said SMI upon detecting said predetermined input;

whereby allowing said system image of said computer system to be saved onto said at least one permanent storage unit in a manner that is independent of said operating system.

9. The computer system as set forth in claim 8, wherein, said computer system further comprises at least one permanent storage parameter table, having at least one storage capacity parameter for describing storage capacity of said at least one permanent storage unit, said improvement further comprises, said at least one storage capacity parameter being pre-initialized in a manner such that said operating system excludes said system image save area from general use storage, said operating system using said at least one permanent storage parameter table to determine general use storage capacity and locations, and said interrupt processing program using said at least one permanent storage parameter table to locate said reserved system image save area.

10. The computer system as set forth in claim 8, wherein, said improvement further comprises, said interrupt processing program further having executable instructions for shutting power off from all components of said computer system except a real time clock and execution resumption circuits of said computer system, in response to a zero volt suspend request; and said pre-determined input being a zero-volt suspend request.

11. The computer system as set forth in claim 10, wherein, said executable instructions for shutting power off and said executable instructions for saving a system image, are part of a suspend request processing subprogram, said suspend request processing subprogram being part of said interrupt processing program.

12. The computer system, as set forth in claim 10, where said operating system and other programs, if any, are interrupted after waiting a predetermined period of time after receiving said zero-volt suspend request, and failing to detect a suspend request cancellation event during said waiting period.

13. The computer system as set forth in claim 8, wherein, said improvement further comprises:

(f) said instructions having a Resume instruction (RSM) for restoring said stored system state data of said computer system from said dedicated memory area to said CPU, switching out and unmapping said dedicated memory are from said main memory space, and resuming execution of said operating system and other programs, if any; and (g) resume detection means for detecting a resume event and causing said interrupt processing program to execute said RSM instruction upon detecting said resume event, said interrupt processing program further having said RSM instruction.

14. The computer system as set forth in claim 13, wherein, said CPU further comprises microcode for configuring said computer system, and said operating system comprises initialization instructions for initializing said computer system, said initialization instructions being given control after said microcode configured said computer system, said improvement further comprises:

said interrupt processing program further having executable instructions for shutting power off from all components of said computer system except a real time clock and execution resumption circuits of said computer system, in response to a zero volt suspend request, and executable instructions for restoring said saved system state data from said reserved system image save area into said dedicated memory area using said saved system image of said computer system in said reserved system image save area if execution of said interrupt processing program being started by an SMI triggered by said initialization instructions;

said resume detection means resetting said CPU and causing said CPU to reconfigure said computer system upon detection of a resume event while in a zero volt suspend;

said initialization instructions triggering an SMI during reinitialization of said computer system after a zero volt suspend; and said interrupt processing program executing said RSM instruction unconditionally after restoring said saved system state data of said computer system into said dedicated memory area.

* * * * *